US009055269B2

United States Patent
Prestenback et al.

(10) Patent No.: US 9,055,269 B2
(45) Date of Patent: Jun. 9, 2015

(54) MESSAGING WITH USER GENERATED CONTENT RELATED TO VIDEO OBJECT TIMECODE

(75) Inventors: Kyle Prestenback, Burbank, CA (US); Evan Tahler, Burbank, CA (US); Brian Kwan, Pasadena, CA (US); Allison Crow, Berkeley, CA (US); Aaron Daly, Lacombe, LA (US)

(73) Assignee: Disney Enterprises, Inc., Burbank, CA (US)

( * ) Notice: Subject to any disclaimer, the term of this patent is extended or adjusted under 35 U.S.C. 154(b) by 1736 days.

(21) Appl. No.: 12/241,635

(22) Filed: Sep. 30, 2008

(65) Prior Publication Data

US 2009/0304346 A1    Dec. 10, 2009

Related U.S. Application Data

(60) Provisional application No. 61/059,494, filed on Jun. 6, 2008.

(51) Int. Cl.

| H04N 7/025 | (2006.01) |
| H04N 5/765 | (2006.01) |
| H04N 7/173 | (2011.01) |
| H04N 21/43 | (2011.01) |
| H04N 21/432 | (2011.01) |
| H04N 21/475 | (2011.01) |
| H04N 21/4788 | (2011.01) |

(52) U.S. Cl.
CPC ........... *H04N 5/765* (2013.01); *H04N 7/17318* (2013.01); *H04N 21/4307* (2013.01); *H04N 21/4325* (2013.01); *H04N 21/475* (2013.01); *H04N 21/4788* (2013.01)

(58) Field of Classification Search
USPC ............. 725/32–34, 37–61; 379/88.11–88.13
See application file for complete search history.

(56) References Cited

U.S. PATENT DOCUMENTS

| 4,875,174 | A | * | 10/1989 | Olodort et al. ................ 715/201 |
| 7,155,676 | B2 | | 12/2006 | Land et al. |
| 2003/0093790 | A1 | * | 5/2003 | Logan et al. ..................... 725/38 |
| 2003/0121054 | A1 | * | 6/2003 | Lorenz .......................... 725/112 |
| 2003/0227853 | A1 | * | 12/2003 | Kim et al. ................... 369/59.25 |
| 2004/0205107 | A1 | | 10/2004 | Yoon |
| 2005/0022251 | A1 | * | 1/2005 | Ohnuma et al. .............. 725/134 |
| 2006/0029193 | A1 | * | 2/2006 | Timmins et al. ........... 379/88.13 |
| 2007/0154190 | A1 | | 7/2007 | Gilley et al. |
| 2007/0276864 | A1 | | 11/2007 | Espelien |
| 2007/0283403 | A1 | | 12/2007 | Eklund et al. |
| 2008/0034041 | A1 | | 2/2008 | Kang et al. |
| 2008/0037529 | A1 | | 2/2008 | Bangalore et al. |
| 2008/0092168 | A1 | | 4/2008 | Logan et al. |

OTHER PUBLICATIONS

Tabuchi et al, "A Proposal of IV Community System that enables users to build and maintain a community associated with the timeline of TV program", NEC C&C Meida Research Laboratories, pp. 441-446 (1999).*

(Continued)

*Primary Examiner* — Nicholas Corbo
(74) *Attorney, Agent, or Firm* — Patent Ingenuity, P.C.; Samuel K. Simpson

(57) ABSTRACT

Subject matter disclosed herein may relate to messaging techniques with user generated content related to video object timecode.

63 Claims, 8 Drawing Sheets

Message Creation 300

(56) References Cited

OTHER PUBLICATIONS

Fortino et al., "A cooperative playback system for on-demand Multimedia sessions over Internet", http://si.deis.unical.it/~fortino/publications/conferences/pdf/icme00.pdf, 4 pages, obtained Sep. 29, 2008.

"Openwave messaging suite supports short movie messaging; Openwave messaging suite enriches J-Phone's 2.5G messaging service with short movie clip attachment" http://findarticles.com/p/articles/mi_hb5243/is_200205/ai_n20349083, May 2002, 2 pages, obtained Sep. 29, 2008.

* cited by examiner

MESSAGING WITH USER GENERATED CONTENT RELATED TO VIDEO OBJECT TIMECODE

This patent application claims benefit of and priority to U.S. Provisional Patent Application 61/059,494, filed Jun. 6, 2008, and titled "Messaging With User Generated Content Related to Video Object Timecode", and which is incorporated in its entirety by reference herein.

FIELD

Subject matter disclosed herein may relate to messaging techniques with user generated content related to video object timecode.

BACKGROUND

Digital video media continue to increase in popularity. For example, optical video discs may provide very high quality images and audio, and may provide a wide range of content, such as, for example, motion pictures. Such discs may be played by electronic devices, such as, for example, stand-alone video playback devices that may provide video and audio signals to televisions, receivers, and/or a number of other audio/visual components. Such electronic devices may also feature connections to networks such as the Internet. Motion picture distribution companies, sometimes referred to as studios, as well as other content providers, may be interested in providing additional features on discs and/or other media to entice consumers to purchase, rent, or otherwise view their digital video content.

DETAILED DESCRIPTION

As discussed above, motion picture studios, as well as other content providers, may be interested in providing features on discs and/or other media along with the movies to entice consumers to purchase, rent, and/or otherwise view their digital video content.

One such feature, for one or more embodiments in accordance with claimed subject matter, includes facilities to allow an individual to create messages with a range of possible content types and to allow the individual to share the messages with one or more other individuals. The content of such messages may be associated with a particular video object, such as a particular movie, for example, and may also be associated with a particular point in time in the video object. For example, a first individual may generate a text message that discusses subject matter relevant to a particular scene in a specified movie. The message may be delivered to an electronic device where a second individual may receive the message. If the second individual is viewing the specified movie associated with the message, the message may be played and/or displayed to the second individual when the particular scene of the movie is displayed. In this manner, the second individual may read the text message of this example at the appropriate time in the movie, so that the text message is relevant to the scene currently being displayed.

Figure 1:
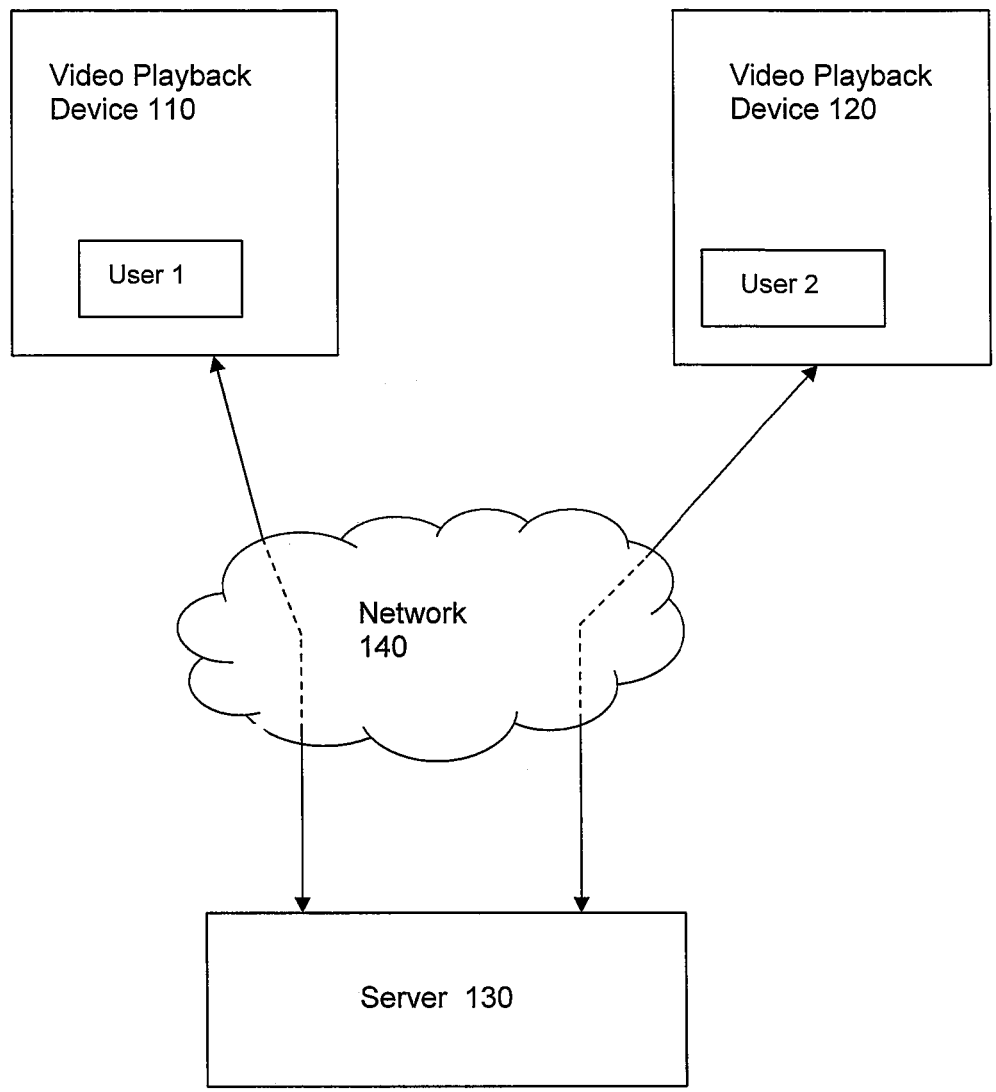
FIG. 1 is a block diagram of an example embodiment of a system comprising video playback devices coupled to a server.

FIG. 1 is a block diagram of an example embodiment of a system comprising a video playback device 110 and a video playback device 120 coupled to a server 130 via a network 140. For an embodiment, network 140 may comprise the Internet. In another embodiment, network 140 may comprise a local area network (LAN). Further, in one or more embodiments, network 140 may comprise a wireless network.

For an embodiment, video playback devices 110 and 120 comprise digital video disk players compatible with and/or compliant with the Blu-ray 2.0 format. The software framework for the messaging system for one embodiment may be loaded into video playback devices 110 and/or 120 from an optical disc containing the video object. Similarly, for an embodiment, each of video playback devices 110 and 120 may include copies of an optical disc containing a movie in order to exchange messages related to the movie.

For this example, video playback device 110 may be associated with a first user (1) and video playback device 120 may be associated with a second user (2). Of course, in typical applications, a video playback device may be accessible by multiple users, and individual users may have access to multiple playback devices. Also, for one or more embodiments, server 140 may be under the control of a third party such as, for example, a movie studio.

In an embodiment, user 1 may insert a video disk into video playback device 110. In response to inserting the disk, a menu may be displayed to user 1. Example menus for one or more embodiments are discussed below. User 1 may select to play a movie from the inserted video disk, and/or may also be shown a menu for generating messages. User 1 may generate a message related to the movie he or she is viewing, and video playback device 110 may transmit the message to one or more electronic devices associated with another user specified in the message. For this example, user 1 may associate the message with user 2, and the message may be transmitted to video playback device 120, which is associated with user 2 for this example. In one or more examples, server 140 may receive the message from video playback device 110, and may forward the message to one or more electronic devices associated with user 2, which, for this example, comprises video playback device 120.

In one or more embodiments, video objects such as, for example, movies stored on optical disks, may comprise a timecode. For example, a movie may comprise a Society of Motion Picture and Television Engineers (SMPTE) timecode, although the scope of claimed subject matter is not limited in this respect. A SMPTE timecode may comprise a binary coded decimal format of hour:minute:second:frame. For one or more embodiments, video playback may occur at thirty frames per second.

For one or more embodiments, messages may comprise metadata including a variety of information. For an example, the metadata may include information identifying a particular video object to associate the message with the video object.

The metadata may also comprise a timestamp related to a video object's timecode that specifies a particular point in time of the object. For example, if user 1 creates a message related to a particular scene of a movie that occurs one hour twenty minutes and twenty seconds into the running time of the movie, the message metadata may include a timestamp identifying that time. In this manner, if user 2 is viewing the movie identified by the metadata, the message created by user 1 may be played and/or displayed to user 2 beginning at the specified point in the movie. In this manner, user 2 is able to view the message from user 1 in a proper context, and user 1 is able to provide commentary or other communications regarding the movie to user 2 in a manner that makes the message relevant to particular portions of the viewed movie without requiring user 2 to be viewing the movie at the same time as user 1.

Further, for one or more embodiments, the message metadata may include information associating the message with one or more users that may receive the message at one or more electronic devices associated with the one or more users. For an example, server 140 may be enabled to store a list of friends associated with each user, and may also be enabled to store lists of electronic devices associated with each user. Therefore, for one or more example embodiments, a first user may create a message and address it to one or more other users, perhaps members of user 1's friends list, and the message may be forwarded by server 140 to one or more electronic devices associated with each specified user.

For one or more embodiments, messages may comprise any of a wide range of content types including, but not limited to, text, animation, playback commands, video, images, drawings, and/or an audio, to name but a few examples of possible message content types.

For one example of a message created by a first user for viewing by one or more other users, consider the following. The first user may be viewing a movie, and may spot something interesting in a particular scene. The first user may access a menu that may allow the first user to pause the movie, if desired, and create the message. The message may include, for this example, drawings made by the first user over the scene in the movie. In other words, the message may comprise a kind of transparent canvas that overlays the movie. The first user may circle an item of interest in the scene, for example, or may draw arrows or other shapes that when viewed by the recipients appear on top of the displayed movie. It should be noted that the video object itself is not altered in any way, but the message content is displayed on top of the movie images. The first user may also include text, or audio, in the message, for example. The first user may create animations that overlay the movie, if desired, for one or more embodiments. Further, the message may include playback commands to control the display of the movie on the playback device playing the message. For example, the message may indicate to jump to a specified scene, and/or may cause the movie to be paused. Messages may further comprise linked media from other sources, such as images and/or sounds.

Using the example content-types described above, the first user may communicate with one or more other users regarding the specified movie, and there is no requirement that the other users be viewing the movie at the same time. The message may be stored at server 140 and/or at one or more electronic devices associated with the addressed users for the message, and may be viewed whenever the recipient views the specified movie.

As used herein, the term "video object" is meant to include any digital video content, such as, for merely one example, a movie stored on an optical disk or other medium. For another example, a video object may be streamed or otherwise transmitted over a network connection, such as, for example, an Internet connection.

Also, as used herein, the term "video playback device" and the like is meant to include any electronic device that may process and/or display a video object. For an embodiment, a video playback device may comprise a stand-alone optical video disk player. For another embodiment, a digital video object playback device may comprise a computing platform such as, for example, a laptop computer.

Figure 2:
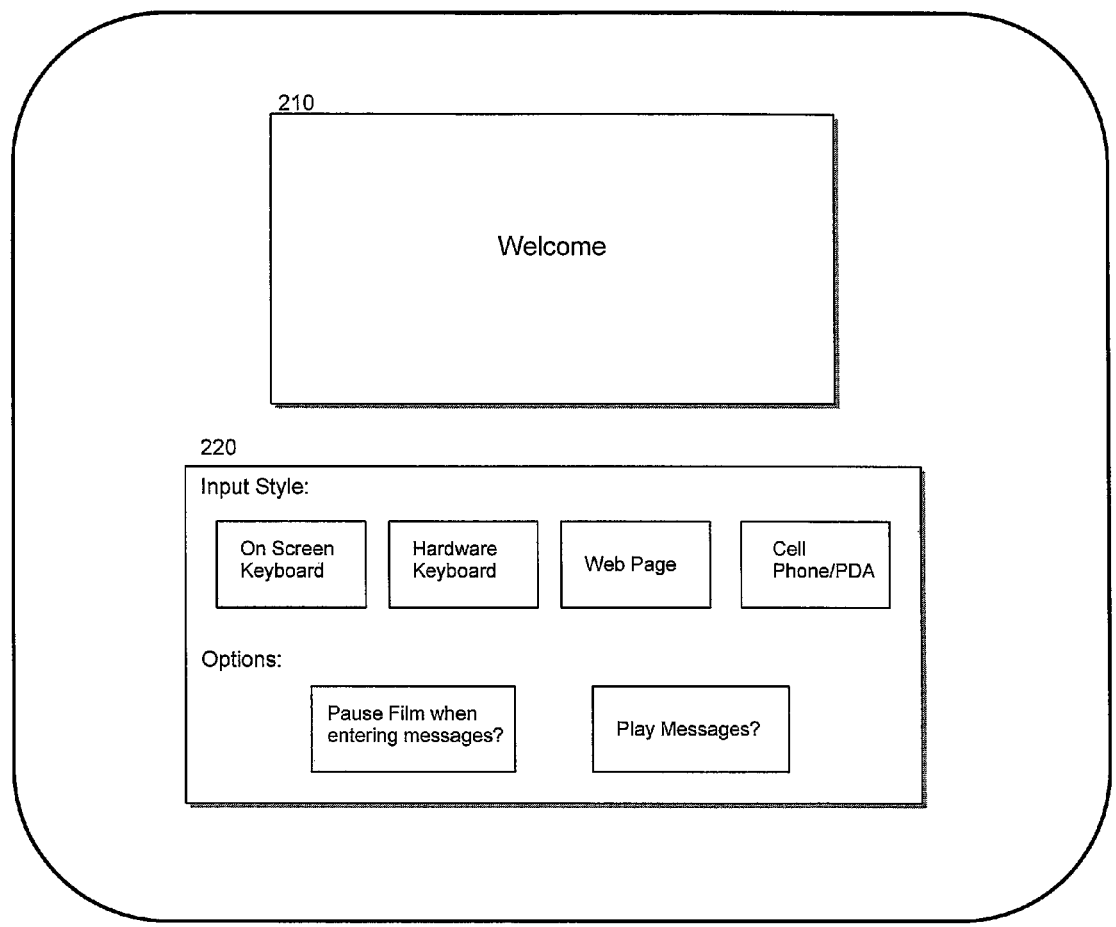
FIG. 2 is an illustration depicting a display of an example introduction and setup screen.

FIG. 2 is an illustration depicting a display of an example introduction and setup screen 200. For an embodiment, screen 200 may be displayed to a user upon initiating play of a video object such as, for this example, a movie on a digital video disk. Introduction and setup screen 200 may comprise a welcome message 210, which may be configured to communicate any of a wide range of information to the viewer. Also included in screen 200 is a menu 220 by which the user may select, for this example, a means for entering inputs. Among the options for entering inputs for this example are an on-screen keyboard, a hardware keyboard, a web page, and a cell phone and/or personal digital assistant (PDA). For the current example, the on-screen keyboard may be manipulated via a remote control or via some other device. The on-screen keyboard may also be operated by way of one or more softkeys located on the playback device.

Also for this example, the hardware keyboard may comprise a keyboard or other pointing device coupled to a playback device. The keyboard may be coupled via a wireless connection, or may be coupled via a wired connection, such as, for example, a Universal Serial Bus (USB) connection.

For one or more embodiments, if the user selects the web page option, inputs may be received via an Internet connection. The user may access a web page, perhaps located at server 140 for an example embodiment, and the user may enter inputs via the web page. The server may forward the inputs to the video playback device. The text may appear on the screen in real-time for an embodiment, with the text appearing the message entry area. Similarly, for the cell phone and/or PDA option, the video playback machine may receive inputs from the user by way of a cellular network ultimately coupled to the video playback device, perhaps in an embodiment by way of the Internet.

Introduction and setup screen 200 for this example also comprises options in menu 220 for pausing a film if entering messages, and also for playing messages. Example functions related to the playing of messages are discussed below. Although screen 200 is described with a specific configuration of displays and options, other embodiments are possible with any of a wide range of configurations of displays and/or options, and the scope of claimed subject matter is not limited in this respect.

Figure 3:
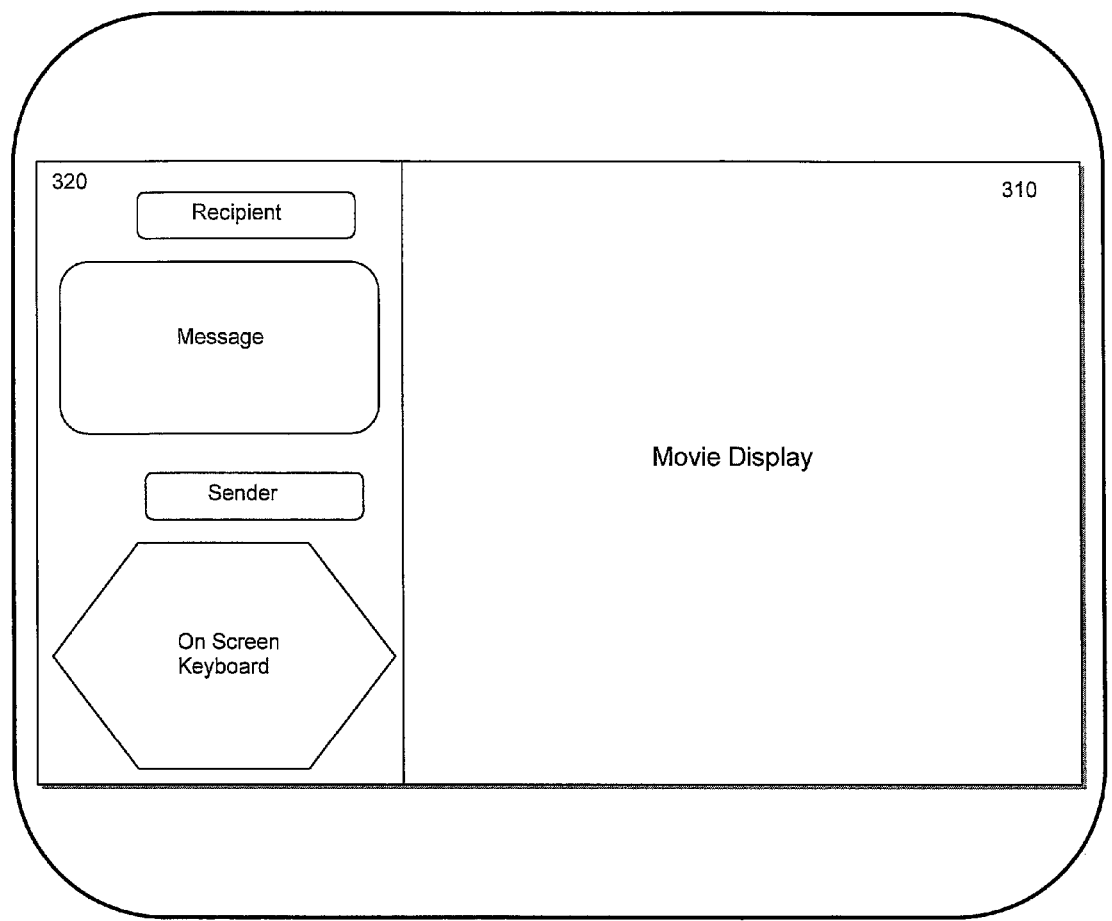
FIG. 3 is an illustration depicting a display of an example message creation screen.

FIG. 3 is an illustration depicting a display of an example message creation screen 300 in accordance with one or more embodiments. Screen 300 for this example may comprise a movie display area 310, and a message creation area 320. As depicted in this example, for an embodiment, message creation may occur during playback of a movie. In other embodiments, and as mentioned above, the movie may be paused during message creation.

Message creation area 320 for this embodiment may comprise a recipient input area, whereby a user may specify one or more recipients of the message. A list of recipients may be stored in the metadata for the message. A message input area may also be provided for this example. Text for this example may be input via any of the techniques described above, including, for example, the on-screen keyboard depicted in message creation area 320. Further, an area for indicating the sender of the message may also be provided. As with the list of recipients, the identity of the sender (creator) of the message may be stored as metadata and delivered with the message to the recipients.

The example embodiments described above deal largely with generating messages for delivery to one or more electronic devices associated with one or more recipients. However, embodiments in accordance with claimed subject matter are not limited to message creation, but further extend to the receipt and display of messages. Also, although the messages mentioned above are described as being created by a consumer, for one or more embodiments messages may also be provided by other entities, including, but not limited to, distributors, producers, and/or marketers of the video object, such as, for example, movie studios, and individuals associated with the creation of the video object such as, for example, film directors, actors, writers, producers, etc. Of course, these are merely examples of entities that may generate messages, and the scope of claimed subject matter is not limited in this respect.

Figure 4:
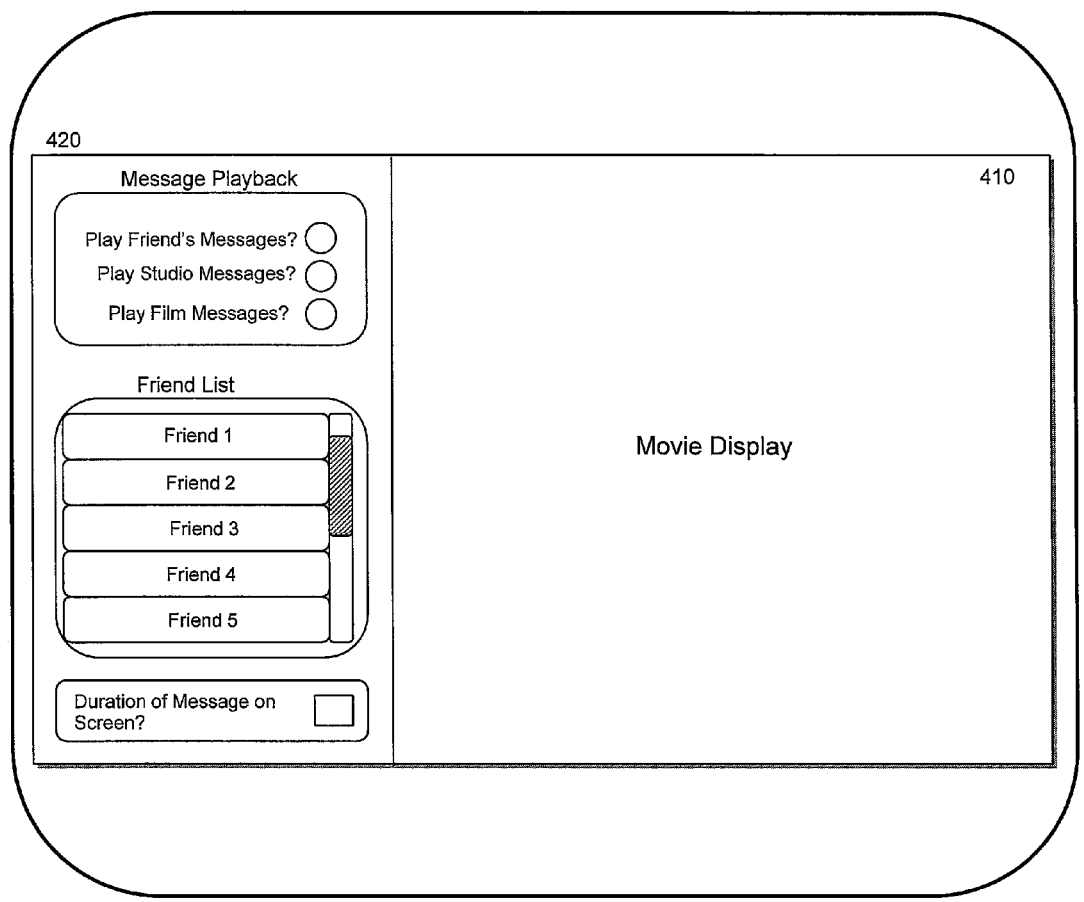
FIG. 4 is an illustration depicting a display of an example received message pop-up screen.

FIG. 4 is an illustration depicting a display of an example received message pop-up screen 400. Such a screen may be displayed by an electronic device such as, for example, video playback device 120 as depicted in FIG. 1. For an embodiment, a user such as user 2 depicted in FIG. 1 may initiate viewing of a video object. For this example, if one or more messages associated with the video object being viewed have been received, pop-up screen 420 may be displayed. Also for this example, screen 400 may comprise a movie display area 410, as well as a message playback menu area 420. In area 420, a user may select whether to display messages from friends, messages, perhaps for marketing purposes for example, from the studio that produced, distributed, and/or marketed the video object being viewed, and/or messages associated with the film being viewed such as, for example, commentary or other information from directors, actors, producers, writers, etc. of the film. The source of the messages may be indicated in message metadata, for an embodiment.

Area 420 for this example may also include a list of friends for the user viewing the video object. From this list, the user may select or deselect messages from individual friends to display. For example, if the user desires to view messages from friends 1 and 2, those friends may be selected, and/or friends 3-5 may be deselected. Also in area 420 for this example is an area for the user to specify the duration of a message on the screen. For example, the user may specify that a message be displayed for a duration of thirty seconds in an embodiment. Also for one or more embodiments, messages from the movie studio are managed by the studio, and not by the user. For example, the studio may control how long a message resides on an electronic device, and/or may control which users are to receive the message. Similarly, messages from those associated with the creation of the film may be managed by entities other than the user.

Further, for one or more embodiments, messages may have a specified default life span, after which the message will not be displayed. For example, the default may be specified as two weeks, and if two weeks have passed since the creation of the message, the message may cease to be displayed to the user. Also, as described more fully below, the visibility window for subsets of messages may be specified apart from the default value.

Figure 5:
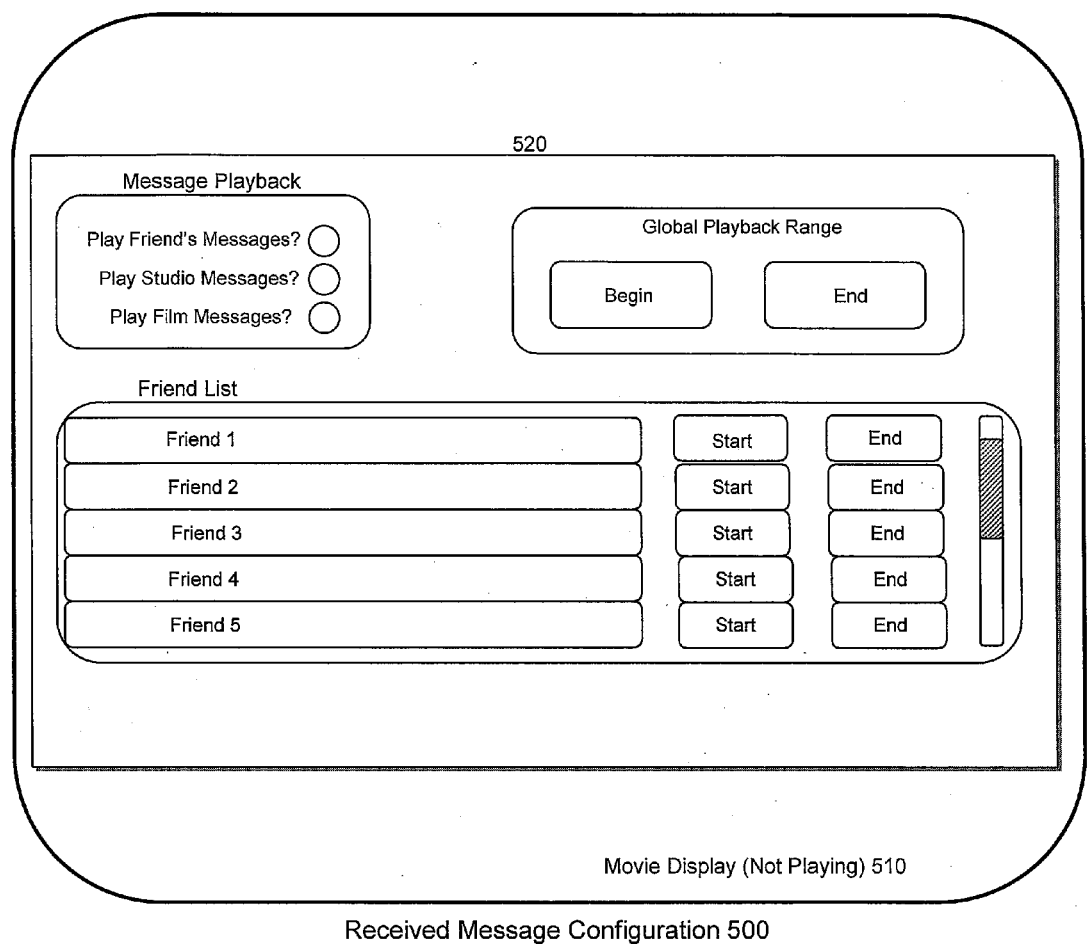
FIG. 5 is an illustration depicting a display of an example received message configuration screen.

FIG. 5 is an illustration depicting a display of an example received message configuration screen 500. For this example, additional options may be displayed to the user with regard to the playing of received messages. For this example, the video object, a film for this example, may be paused during display of screen 500. Also for this example, a global playback range may be specified, whereby the user may specify a range of time and/or dates related to message creation. If a message has a creation date that falls within the specified range, it may be displayed. However, separate ranges for dates of creation may be specified for the various friends, as depicted in example screen 500. In this manner, messages may be kept current.

As described previously, for one embodiment user-generated messages may be shared between friends. Friends lists may be maintained by a central server such as server 140, for an example. The server may be controlled by a movie studio for an example, or by another entity. Also for one embodiment, studio-generated messages may be viewable by all users. Similarly, film creator-generated messages may be viewable by all viewers. In a further embodiment, users may select which of their friends to turn on and/or off as far as playback of messages is concerned. Still further, for one or more alternative embodiments, the playback range for various messages may be configured. A user, for one embodiment, may not be allowed to control messaged generated by the studio and/or by the movie creators.

Figure 6:
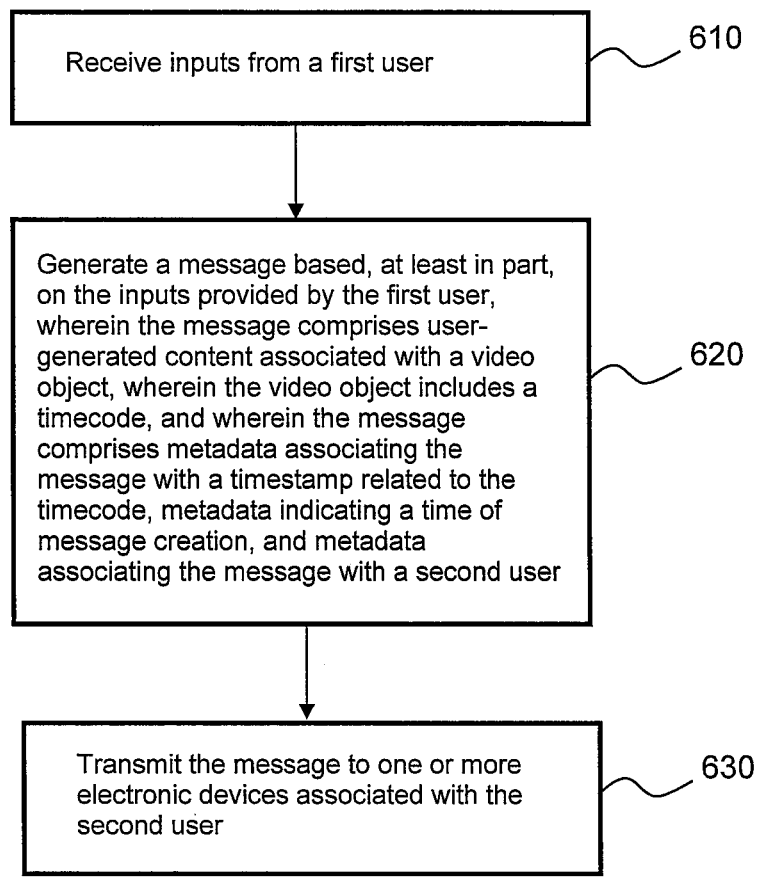
FIG. 6 is a flow diagram of an example embodiment of a method for generating a message.

FIG. 6 is a flow diagram of an example embodiment of a method for generating a message. At block 610, inputs may be received from a first user. For one or more embodiments, any of the techniques described above in connection with FIG. 2, for example, may be utilized by the user to provide the inputs. At block 620, a message may be generated based, at least in part, on the inputs provided by the first user. The message may comprise user-generated content associated with a digital video object. For an example embodiment, the video object may comprise a timecode, and the message may comprise metadata associating the message with a timestamp related to the video object timecode. The message may further comprise metadata indicating a time of creation, and may also comprise metadata associating the message with a second user. That is, a second user may be specified as an intended recipient of the message. Further for an embodiment, the message may be transmitted at block 630 to one or more electronic devices associated with the specified second user. As described previously, for some embodiments, one or more electronic devices may be associated with a user. Similarly, one or more users may be associated with a particular electronic device. For an embodiment, such relationships between electronic devices and users may be maintained in a central server such as, for example, server 140 depicted in FIG. 1. Embodiments in accordance with claimed subject matter may include all of, less than, or more than blocks 610-630. Also, the order of blocks 610-630 is merely an example order, and these blocks may also be performed in a different order.

Figure 7:
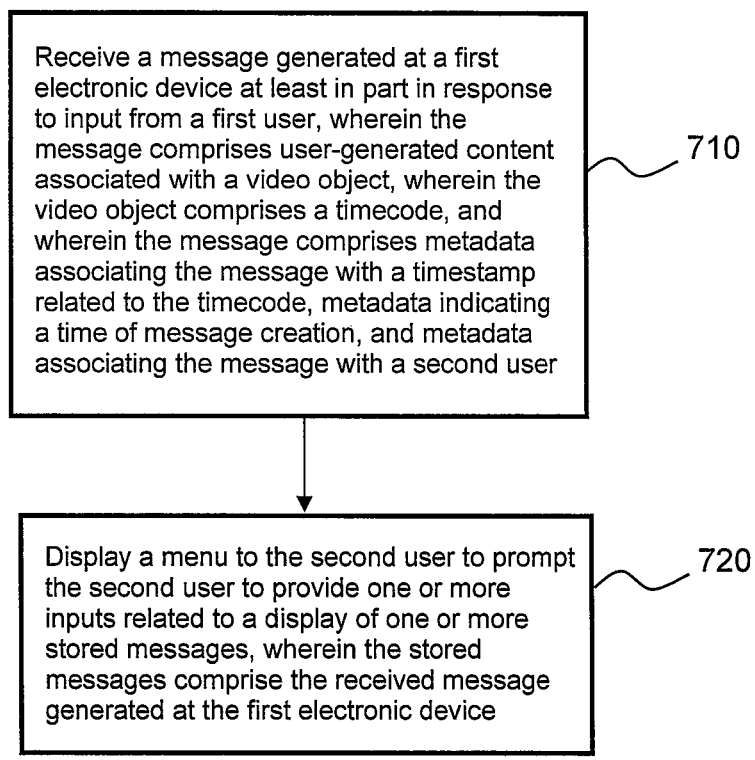
FIG. 7 is a flow diagram of an example embodiment of a method for receiving a message.

FIG. 7 is a flow diagram of an example embodiment of a method for receiving a message. For this example, at block 710 a message may be received, wherein the message was generated at a first electronic device at least in part in response to input from a first user. The message may comprise user-generated content that may be associated with a video object. For this example embodiment, the video object may comprise a timecode, and the message may comprise metadata associating the message with a timestamp related to the video object timecode. The message may further comprise metadata indicating a time of creation for the message, and may also comprise metadata associating the message with a second user. That is, a second user may be specified as an intended recipient of the message. At block 720, a menu may be displayed to the second user to prompt the second user to provide one or more inputs related to a display of one or more stored messages, wherein the stored messages may comprise the received message generated at the first electronic device. Embodiments in accordance with claimed subject matter may include all of, less than, or more than blocks 710-720. Also, the order of blocks 710-720 is merely an example order, and the scope of claimed subject matter is not limited in this respect.

Figure 8:
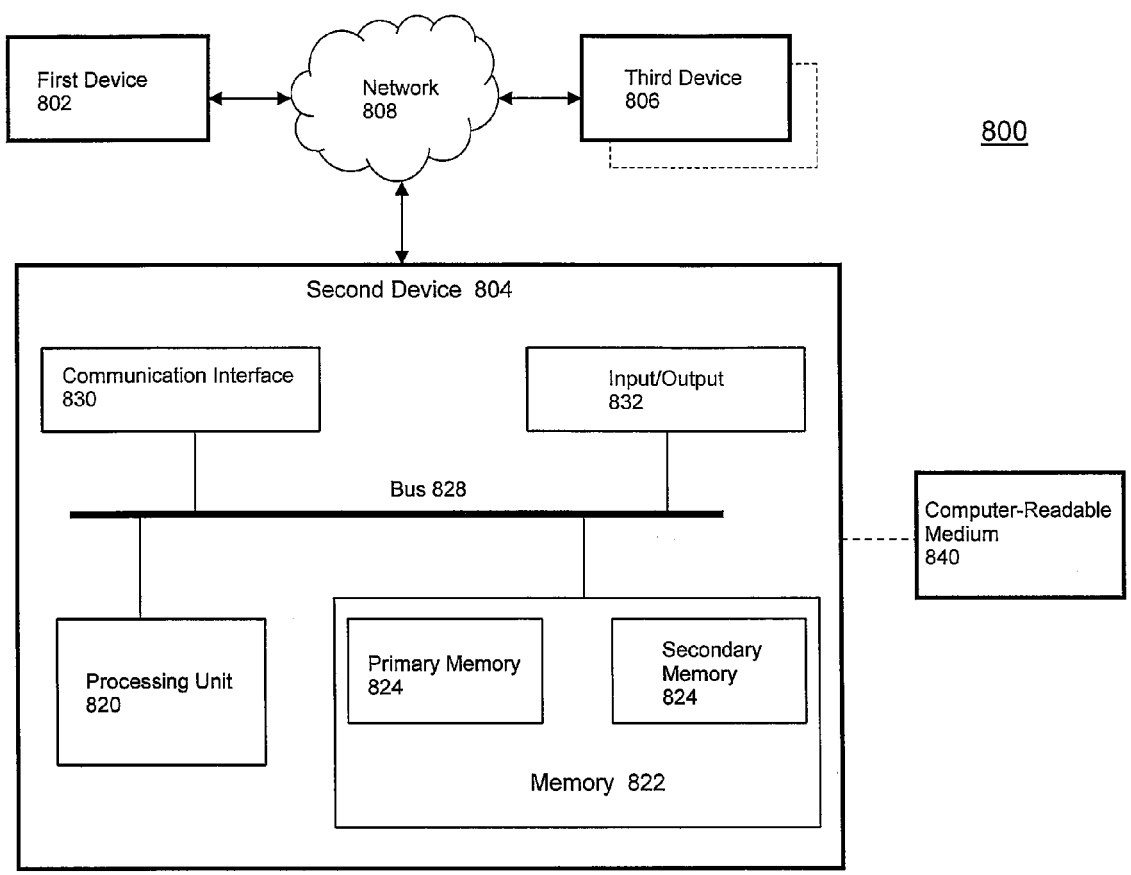
FIG. 8 is a block diagram illustrating an example system comprising a plurality of computing devices coupled via a network in accordance with one or more embodiments.

FIG. 8 is a schematic diagram illustrating an exemplary embodiment of a computing environment system 800 that may include one or more devices configurable to implement techniques and/or processes described above in connection with the creation and/or storage and/or transmission and/or playing of messages discussed above in connection with FIGS. 1-7, for example. System 800 may include, for example, a first device 802, a second device 804, and a third device 806, which may be operatively coupled together through a network 808.

First device 802, second device 804 and third device 806, as shown in FIG. 8, may be representative of any device, appliance or machine that may be configurable to exchange data over network 808. By way of example but not limitation, any of first device 802, second device 804, or third device 806 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Of course, any or all of first device, second device, and/or third device may comprise a digital video playback device for one or more embodiments.

Similarly, network 808, as shown in FIG. 8, is representative of one or more communication links, processes, and/or resources configurable to support the exchange of data between at least two of first device 802, second device 804, and third device 806. By way of example but not limitation, network 808 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to network 808.

It is recognized that all or part of the various devices and networks shown in system 800, and the processes and methods as further described herein, may be implemented using or otherwise include hardware, firmware, software, or any combination thereof.

Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 and/or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory and/or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any medium that can carry and/or make accessible data, code and/or instructions for one or more of the devices in system 800.

Second device 804 may include, for example, a communication interface 830 that provides for or otherwise supports the operative coupling of second device 804 to at least network 808. By way of example but not limitation, communication interface 830 may include a network interface device or card, a modem, a router, a switch, a transceiver, and the like.

Second device 804 may include, for example, an input/output 832. Input/output 832 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 832 may include an operatively configured display, speaker, keyboard, mouse, trackball, touch screen, data port, etc.

In the detailed description herein, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. An embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that if executed by an electronic device, such as a digital video playback device, a computer, a computing platform and/or system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. For one or more embodiments, instructions may be stored on an optical video disc such as, for example, a disk compliant with and/or compatible with the Blu-ray format. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

Unless specifically stated otherwise, as apparent from the discussion herein, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method comprising:
receive inputs from a first user;
generating a message based, at least in part, on the inputs provided by the first user, wherein the message comprises user-generated content associated with a video object, wherein the video object includes a timecode, and wherein the message comprises metadata associating the message with a timestamp related to the timecode, metadata indicating a time of message creation, and metadata associating the message with a second user; and transmitting the message to one or more electronic devices associated with the second user.

2. The method of claim 1, further comprising displaying a menu to the first user prompting the first user to provide the inputs.

3. The method of claim 2, wherein said displaying the menu comprises displaying the menu during playback of the video object.

4. The method of claim 3, further comprising pausing playback of the video object at least in part in response to the inputs received from the first user.

5. The method of claim 1, wherein said receiving the inputs from the first user comprises receiving the inputs via one of a remote controller device, a hardwired keyboard, a cellular phone via a network connection, one or more softkeys, and/or a wireless input device.

6. The method of claim 1, wherein the user-generated content comprises one or more of a text message, an animation, an audio message, an image, a drawing, and/or a second video object.

7. The method of claim 6, wherein the user-generated content comprises content time-synched with the video object at least in part via the video object timestamp.

8. The method of claim 6, wherein the message further comprises metadata related to one or more playback commands associated with the video object, wherein the one or more playback commands are associated with the timestamp related to the timecode.

9. The method of claim 8, wherein the one or more playback commands comprise one or more of a play command, a fast forward command, a reverse command, a pause command, and/or a jump to scene command.

10. The method of claim 1, wherein said transmitting the message to the electronic device associated with the second user comprises transmitting the message to a server computing platform for further transmission to the one or more electronic devices associated with the second user.

11. The method of claim 1, wherein the video object comprises a movie stored on a video disk compliant with a Blu-ray standard.

12. A method, comprising:
receiving a message generated at a first electronic device at least in part in response to input from a first user, wherein the message comprises user-generated content associated with a video object, wherein the video object comprises a timecode, and wherein the message comprises metadata associating the message with a timestamp related to the timecode, metadata indicating a time of message creation, and metadata associating the message with a second user; and displaying a menu to the second user to prompt the second user to provide one or more inputs related to a display of one or more stored messages, wherein the stored messages comprise the received message generated at the first electronic device.

13. The method of claim 12, wherein said displaying the menu comprises displaying the menu during playback of a video object.

14. The method of claim 12, wherein said displaying the menu comprises displaying on option for the second user to initiate playing of at least a subset of the one or more stored messages.

15. The method of claim 14, wherein said playing of at least a subset of the one or more messages comprises playing the received message at a time specified by the time stamp related to the video object timecode.

16. The method of claim 12, wherein the stored messages comprise messages from one or more friends of the second user, one or more messages from one or more distributors of the video object, and/or one or more messages from one or more developers of the video object.

17. The method of claim 16, wherein said displaying the menu comprises displaying an option for the second user to select playback of messages from one or more of the friends, distributors, and/or developers.

18. The method of claim 17, further comprising playing back at least a subset of the stored messages based, at least in part, on a selection provided by the second user with respect to displaying messages from one or more of the friends, distributors, and/or developers.

19. The method of claim 12, wherein said displaying the menu comprises displaying one or more options for selecting a duration of a displayed message on a screen.

20. The method of claim 12, wherein said displaying the menu comprises displaying one or more options for indicating a range of dates of messages to be displayed.

21. The method of claim 20, wherein said displaying one or more options for indicating a range of dates comprises displaying one or more options for indicating separate ranges of dates of messages to be displayed for each friend of a friends list associated with the second user.

22. An article, comprising: a hardware storage medium having stored thereon instructions that, if executed, enable a video playback device to:
receive inputs from a first user;
generate a message based, at least in part, on the inputs provided by the first user, wherein the message comprises user-generated content associated with a video object, wherein the video object includes a timecode, and wherein the message comprises metadata associating the message with a timestamp related to the timecode, metadata indicating a time of message creation, and metadata associating the message with a second user; and transmit the message to one or more electronic devices associated with the second user.

23. The article of claim 22, wherein the hardware storage medium has stored thereon further instructions that, if executed, further enable the video playback device to display a menu to the first user prompting the first user to provide the inputs.

24. The article of claim 23, wherein the hardware storage medium has stored thereon further instructions that, if executed, further enable the video playback device to display the menu by displaying the menu during playback of the video object.

25. The article of claim 24, wherein the hardware storage medium has stored thereon further instructions that, if executed, further enable the video playback device to pause playback of the video object at least in part in response to the inputs received from the first user.

26. The article of claim 22, wherein the hardware storage medium has stored thereon further instructions that, if executed, further enable the video playback device to receive the inputs from the first user by receiving the inputs via one of a remote controller device, a hardwired keyboard, a cellular phone via a network connection, one or more softkeys, and/or a wireless input device.

27. The article of claim 22, wherein the user-generated content comprises one or more of a text message, an animation, an audio message, an image, a drawing, and/or a second video object.

28. The article of claim 27, wherein the user-generated content comprises content time-synched with the video object at least in part via the video object timestamp.

29. The article of claim 27, wherein the message further comprises metadata related to one or more playback commands associated with the video object, wherein the one or more playback commands are associated with the timestamp related to the timecode.

30. The article of claim 29, wherein the one or more playback commands comprise one or more of a play command, a fast forward command, a reverse command, a pause command, and/or a jump to scene command.

31. The article of claim 22, wherein the hardware storage medium has stored thereon further instructions that, if executed, further enable the video playback device to transmit the message to the electronic device associated with the second user by transmitting the message to a server computing platform for further transmission to the one or more electronic devices associated with the second user.

32. The article of claim 22, wherein the video object comprises a movie stored on a video disk compliant with a blu-ray standard.

33. An article, comprising: a hardware storage medium having stored thereon instructions that, if executed, enable a video playback device to:
receive a message generated at a first electronic device at least in part in response to input from a first user, wherein the message comprises user-generated content associated with a video object, wherein the video object comprises a timecode, and wherein the message comprises metadata associating the message with a timestamp related to the timecode, metadata indicating a time of message creation, and metadata associating the message with a second user; and
display a menu to a second user to prompt the second user to provide one or more inputs related to a display of one or more stored messages, wherein the stored messages comprise the received message generated at the first electronic device.

34. The article of claim 33, wherein the hardware storage medium has stored thereon further instructions that, if executed, further enable the video playback device to display the menu by displaying the menu during playback of a video object.

35. The article of claim 33, wherein the hardware storage medium has stored thereon further instructions that, if executed, further enable the video playback device to display the menu by displaying on option for the second user to initiate playing of at least a subset of the one or more stored messages.

36. The article of claim 35, wherein the hardware storage medium has stored thereon further instructions that, if executed, further enable the video playback device to play of at least a subset of the one or more messages by playing the received message at a time specified by the time stamp related to the video object timecode.

37. The article of claim 33, wherein the stored messages comprise messages from one or more friends of the second user, one or more messages from one or more distributors of the video object, and/or one or more messages from one or more developers of the video object.

38. The article of claim 37, wherein the hardware storage medium has stored thereon further instructions that, if executed, further enable the video playback device to display the menu by displaying an option for the second user to select playback of messages from one or more of the friends, distributors, and/or developers.

39. The article of claim 38, wherein the hardware storage medium has stored thereon further instructions that, if executed, further enable the video playback device to play back at least a subset of the stored messages based, at least in part, on a selection provided by the second user with respect to displaying messages from one or more of the friends, distributors, and/or developers.

40. The article of claim 33, wherein the hardware storage medium has stored thereon further instructions that, if executed, further enable the video playback device to display the menu by displaying one or more options for selecting a duration of a displayed message on a screen.

41. The article of claim 33, wherein the hardware storage medium has stored thereon further instructions that, if executed, further enable the video playback device to display the menu by displaying one or more options for indicating a range of dates of messages to be displayed.

42. The article of claim 41, wherein the hardware storage medium has stored thereon further instructions that, if executed, further enable the video playback device to display one or more options for indicating a range of dates by displaying one or more options for indicating separate ranges of dates of messages to be displayed for each friend of a friends list associated with the second user.

43. A video playback device, comprising:
means for receiving inputs from a first user;
means for generating a message based, at least in part, on the inputs provided by the first user, wherein the message comprises user-generated content associated with a video object, wherein the video object includes a timecode, and wherein the message comprises metadata associating the message with a timestamp related to the timecode, metadata indicating a time of message creation, and metadata associating the message with a second user; and
means for transmitting the message to one or more electronic devices associated with the second user.

44. The video playback device of claim 43, further comprising means for displaying a menu to the first user prompting the first user to provide the inputs.

45. The video playback device of claim 44, wherein said means for displaying the menu comprises means for displaying the menu during playback of the video object.

46. The video playback device of claim 45, further comprising means for pausing playback of the video object at least in part in response to the inputs received from the first user.

47. The video playback device of claim 43, wherein said means for receiving the inputs from the first user comprises means for receiving the inputs via one of a remote controller device, a hardwired keyboard, a cellular phone via a network connection, one or more softkeys, and/or a wireless input device.

48. The video playback device of claim 43, wherein the user-generated content comprises one or more of a text message, an animation, an audio message, an image, a drawing, and/or a second video object.

49. The video playback device of claim 48, wherein the user-generated content comprises content time-synched with the video object at least in part via the video object timestamp.

50. The video playback device of claim 48, wherein the message further comprises metadata related to one or more playback commands associated with the video object, wherein the one or more playback commands are associated with the timestamp related to the timecode.

51. The video playback device of claim 50, wherein the one or more playback commands comprise one or more of a play command, a fast forward command, a reverse command, a pause command, and/or a jump to scene command.

52. The video playback device of claim 43, wherein said means for transmitting the message to the electronic device associated with the second user comprises means for transmitting the message to a server computing platform for further transmission to the one or more electronic devices associated with the second user.

53. The video playback device of claim 43, wherein the video object comprises a movie stored on a video disk compliant with a blu-ray standard.

54. A video playback device, comprising:
  means for receiving a message generated at a first electronic device at least in part in response to input from a first user, wherein the message comprises user-generated content associated with a video object, wherein the video object comprises a timecode, and wherein the message comprises metadata associating the message with a timestamp related to the timecode, metadata indicating a time of message creation, and metadata associating the message with a second user; and
  means for displaying a menu to the second user to prompt the second user to provide one or more inputs related to a display of one or more stored messages, wherein the stored messages comprise the received message generated at the first electronic device.

55. The video playback device of claim 54, wherein said means for displaying the menu comprises means for displaying the menu during playback of a video object.

56. The video playback device of claim 54, wherein said means for displaying the menu comprises means for displaying on option for the second user to initiate playing of at least a subset of the one or more stored messages.

57. The video playback device of claim 56, wherein said means for playing of at least a subset of the one or more messages comprises means for playing the received message at a time specified by the time stamp related to the video object timecode.

58. The video playback device of claim 54, wherein the stored messages comprise messages from one or more friends of the second user, one or more messages from one or more distributors of the video object, and/or one or more messages from one or more developers of the video object.

59. The video playback device of claim 58, wherein said means for displaying the menu comprises means for displaying an option for the second user to select playback of messages from one or more of the friends, distributors, and/or developers.

60. The video playback device of claim 59, further comprising means for playing back at least a subset of the stored messages based, at least in part, on a selection provided by the second user with respect to displaying messages from one or more of the friends, distributors, and/or developers.

61. The video playback device of claim 54, wherein said means for displaying the menu comprises means for displaying one or more options for selecting a duration of a displayed message on a screen.

62. The video playback device of claim 54, wherein said means for displaying the menu comprises means for displaying one or more options for indicating a range of dates of messages to be displayed.

63. The video playback device of claim 62, wherein said means for displaying one or more options for indicating a range of dates comprises means for displaying one or more options for indicating separate ranges of dates of messages to be displayed for each friend of a friends list associated with the second user.

* * * * *